(12) United States Patent
Dahlgren et al.

(10) Patent No.: US 12,615,314 B2
(45) Date of Patent: Apr. 28, 2026

(54) COMPUTER SOFTWARE MODULE ARRANGEMENT, A CIRCUITRY ARRANGEMENT, AN ARRANGEMENT AND A METHOD FOR AN IMPROVED USER INTERFACE FOR INTERNET OF THINGS DEVICES

(71) Applicant: Telefonaktiebolaget LM Ericsson (publ), Stockholm (SE)

(72) Inventors: Fredrik Dahlgren, Lund (SE); Alexander Hunt, Tygelsjö (SE); Andreas Kristensson, Södra Sandby (SE); Magnus Olsson, Klagshamn (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 135 days.

(21) Appl. No.: 18/275,674

(22) PCT Filed: Mar. 3, 2021

(86) PCT No.: PCT/EP2021/055347

§ 371 (c)(1),
(2) Date: Aug. 3, 2023

(87) PCT Pub. No.: WO2022/184253

PCT Pub. Date: Sep. 9, 2022

(65) Prior Publication Data

US 2024/0129370 A1 Apr. 18, 2024

(51) Int. Cl.
H04L 67/125 (2022.01)
G06F 1/3206 (2019.01)
G06F 3/16 (2006.01)

(52) U.S. Cl.
CPC .......... H04L 67/125 (2013.01); G06F 1/3206 (2013.01); G06F 3/167 (2013.01)

(58) Field of Classification Search
None
See application file for complete search history.

(56) References Cited

U.S. PATENT DOCUMENTS

| | | | | |
|---|---|---|---|---|
| 11,410,541 B1 * | 8/2022 | Chung | ................. | G01S 5/0284 |
| 2013/0223635 A1 * | 8/2013 | Singer | ................. | H04R 1/1041 |
| | | | | 381/56 |

(Continued)

FOREIGN PATENT DOCUMENTS

| | | |
|---|---|---|
| EP | 3502838 A1 | 6/2019 |
| KR | 1020160024733 A | 3/2016 |

OTHER PUBLICATIONS

PCT International Search Report, mailed Nov. 2, 2021, in connection with International Application No. PCT/EP2021/055347, all pages.

(Continued)

*Primary Examiner* — Linda Huynh

(74) *Attorney, Agent, or Firm* — Weisberg I.P. Law, P.A.

(57) ABSTRACT

A user interface arrangement comprising a controller, a sensor and a communication interface, wherein the sensor is arranged to receive input, and the controller is configured to: cause the user interface arrangement to operate in a first power level; receive the input; detect an indication of at least one command, and in response thereto cause the user interface arrangement to operate in a second power level, wherein the second power level is higher than the first power level; determine that at least one IoT device is in front of the user interface arrangement, and in response thereto cause the user interface arrangement to operate in a second power level, wherein the third power level is higher than the second power level; extract at least one command from the input; match the extracted at least one command to the at least one (Continued)

IoT device, and if a match is found; execute the extracted at least one command on the matching IoT device.

14 Claims, 8 Drawing Sheets

(56)                   References Cited

U.S. PATENT DOCUMENTS

| | | | | |
|---|---|---|---|---|
| 2013/0339028 | A1* | 12/2013 | Rosner | G10L 15/22 |
| | | | | 704/E11.001 |
| 2014/0149122 | A1* | 5/2014 | Zhang | G06F 1/3203 |
| | | | | 704/275 |
| 2014/0274211 | A1* | 9/2014 | Sejnoha | H04M 1/724 |
| | | | | 455/563 |
| 2015/0049884 | A1 | 2/2015 | Ye | |
| 2017/0031420 | A1* | 2/2017 | Wong | G10L 25/84 |
| 2017/0060530 | A1 | 3/2017 | Maker, III | |
| 2017/0061404 | A1* | 3/2017 | Tunnell | G06Q 20/327 |
| 2017/0289766 | A1* | 10/2017 | Scott | H04W 8/005 |
| 2019/0272459 | A1 | 9/2019 | Kim | |
| 2020/0072937 | A1* | 3/2020 | Baek | H04R 1/406 |
| 2020/0098354 | A1* | 3/2020 | Lin | G10L 15/22 |
| 2020/0133374 | A1* | 4/2020 | Sinha | G06F 3/013 |
| 2020/0387709 | A1* | 12/2020 | Baykaner | G06F 3/04842 |
| 2021/0005181 | A1* | 1/2021 | Abed | G10L 15/285 |
| 2022/0036881 | A1* | 2/2022 | Elkhatib | G06N 3/063 |

OTHER PUBLICATIONS

PCT Written Opinion, mailed Nov. 2, 2021, in connection with International Application No. PCT/EP2021/055347, all pages.
Woolley, M., "Bluetooth Direction Finding, A Technical Overview", Bluetooth, Mar. 20, 2019, 30 pages.
Lee, J., "See-Direct Communication" Bluetooth New Work Proposal, Feb. 11, 2020, 11 pages.

* cited by examiner

100

400

500

COMPUTER SOFTWARE MODULE ARRANGEMENT, A CIRCUITRY ARRANGEMENT, AN ARRANGEMENT AND A METHOD FOR AN IMPROVED USER INTERFACE FOR INTERNET OF THINGS DEVICES

TECHNICAL FIELD

The present invention relates to an arrangement, an arrangement comprising computer software modules, an arrangement comprising circuits, a device and a method for providing an improved user interface for internet of things devices, and in particular to an arrangement, an arrangement comprising computer software modules, an arrangement comprising circuits, a device and a method for providing an improved user interface for selecting an internet of things device adaptable to visual impairments.

BACKGROUND

Many types of devices or items are becoming connected as IoT devices, allowing them to communicate with other devices. However, when users interact with them, they typically need some form of device or connected key that they need to be press or otherwise activated to send commands to the IoT device. Furthermore, the controlling device must typically be paired with the IoT device that they shall communicate with, and in the case of several such devices there are typically manual steps to select which such device shall be connected. New devices that the user has not been controlling before often requires some additional manual steps to pair and authorize, as well as for the user to learn how these can be controlled.

Voice control exist today for certain use cases or scenarios, such as phone or home voice assistants (e.g. Amazon Alexa or Google Assistant). These typically need a magic word to start listening and interpreting what is being said, and for them to control other devices these devices must first be paired and setup in a proper way. This typically demands several manual steps. Furthermore, in order to send commands to a specific IoT device via an Alexa or Google Assistant device, one typically need to very explicitly describe which IoT device that it may concern which might be complicated and ambiguous.

SUMMARY

An object of the present teachings is to overcome or at least reduce or mitigate the problems discussed in the background section. The inventors have realized that technologies such as Bluetooth Angle-of-Arrival (AoA) or Angle-of-Departure may be utilized to provide a simple manner for selecting a device, that is also highly power efficient. Using such technologies it is possible to detect the angle from an antenna array of a communication interface (in e.g. a pair of glasses) to the IoT device it communicates with. That means that it is possible to detect whether that IoT device is in front of the person wearing the glasses.

According to one aspect a user interface arrangement is provided, the user interface arrangement comprising a controller, a sensor and a communication interface, wherein the sensor is arranged to receive input, and the controller is configured to: cause the user interface arrangement to operate in a first power level; receive the input (SW); detect an indication of at least one command, and in response thereto cause the user interface arrangement to operate in a second power level, wherein the second power level is higher than the first power level; determine that at least one IoT device is in front of the user interface arrangement, and in response thereto cause the user interface arrangement to operate in a second power level, wherein the third power level is higher than the second power level; extract at least one command from the input; match the extracted at least one command to the at least one IoT device, and if a match is found; execute the extracted at least one command on the matching IoT device.

The solution may be implemented as a software solution, a hardware solution or a mix of software and hardware components.

In some embodiment the sensor comprises an audio input device and the received input is audio, and the controller is further configured to detect the indication of at least one command by detecting that there is at least one word in the received audio input.

In some embodiment the controller is further configured to detect that there is at least one word in the received audio input by analyzing physical characteristics of the received audio input.

In some embodiment analyzing the physical characteristics of the received audio input comprises: determining that at least one portion of the audio input is in a frequency range corresponding to spoken words.

In some embodiment analyzing the physical characteristics of the received audio input further comprises: determining that said at least one portion is of a duration; determining that said at least one portion is in an amplitude range; and or determining that said at least one portion is in a sequence of such portions.

In some embodiment the communication interface is configured to determine an angle to or from the at least one IoT device.

In some embodiment the communication interface is configured to determine the angle using Bluetooth™ technology.

In some embodiment the controller is further configured to extract the commands utilizing speech analysis.

In some embodiment the controller is further configured to match the extracted commands by causing the at least one IoT device to perform the matching.

In some embodiment the controller is further configured to receive a user input acknowledging the execution of the command.

In some embodiment the first power level enables receiving input, the second power level enables operating the communication interface, and the third power level enables extraction of commands from the input.

In some embodiment the sensor comprises a motion sensor, and the received input comprises at least one gesture.

In some embodiment the extracted command comprises an identifier for one of the at least one IoT devices.

In some embodiment the user interface arrangement is a wearable device.

In one such embodiment the user interface arrangement is a head-worn device, such as smart glasses or a headset. In an alternative such embodiment the user interface arrangement is a watch.

In some embodiment the gesture comprises an indication of one of the at least one IoT device.

According to another aspect there is provided a method for a user interface arrangement comprising a sensor and a communication interface, wherein the sensor is arranged to receive input, wherein the method comprises: causing the user interface arrangement to operate in a first power level;

receiving said input (SW); detecting an indication of at least one command, and in response thereto cause the user interface arrangement to operate in a second power level, wherein the second power level is higher than the first power level; determining that at least one IoT device is in front of the user interface arrangement, and in response thereto cause the user interface arrangement to operate in a second power level, wherein the third power level is higher than the second power level; extracting at least one command from the input; matching the extracted at least one command to the at least one IoT device, and if a match is found; executing the extracted at least one command on the matching IoT device.

According to another aspect there is provided a computer-readable medium carrying computer instructions that when loaded into and executed by a controller of a user interface arrangement enables the user interface arrangement to implement the method according to herein.

According to another aspect there is provided a software component arrangement for a user interface arrangement comprising a sensor and a communication interface, wherein the sensor is arranged to receive input, wherein the software component arrangement comprises: a software component for causing the user interface arrangement to operate in a first power level; a software component for receiving said input (SW); a software component for detecting an indication of at least one command, and in response thereto cause the user interface arrangement to operate in a second power level, wherein the second power level is higher than the first power level; a software component for determining that at least one IoT device is in front of the user interface arrangement, and in response thereto cause the user interface arrangement to operate in a second power level, wherein the third power level is higher than the second power level; a software component for extracting at least one command from the input; a software component for matching the extracted at least one command to the at least one IoT device, and if a match is found; a software component for executing the extracted at least one command on the matching IoT device.

For the context of the teachings herein a software component may be replaced or supplemented by a software module.

According to another aspect there is provided a circuitry arrangement for a user interface arrangement comprising a sensor and a communication interface, wherein the sensor is arranged to receive input, and wherein the circuitry arrangement comprises: circuitry for causing the user interface arrangement to operate in a first power level; circuitry for receiving said input (SW); circuitry for detecting an indication of at least one command, and in response thereto cause the user interface arrangement to operate in a second power level, wherein the second power level is higher than the first power level; circuitry for determining that at least one IoT device is in front of the user interface arrangement, and in response thereto cause the user interface arrangement to operate in a second power level, wherein the third power level is higher than the second power level; circuitry for extracting at least one command from the input; circuitry for matching the extracted at least one command to the at least one IoT device, and if a match is found; circuitry for executing the extracted at least one command on the matching IoT device.

Further embodiments and advantages of the present invention will be given in the detailed description.

A user can thus address an IoT device by simply being directed towards the IoT device and give a command that makes sense for that IoT device. This is also achieved in a highly power-efficient solution that is suitable for battery-operated systems which minimize the power consumption when no IoT device is actively addressed and once an IoT device is addressed it is possible to detect sound and interpret the information in a manner requiring a minimum of power.

The core essence center on three phases. The first ultra-low power phase, being always on for the device (smart glasses, smartphone, etc.), detects a triggering event that with some likelihood indicates that the user is (beginning to) address an IoT device. The second phase, demanding somewhat higher power consumption, involves an assessment whether there are any IoT devices that might be addressed. The third phase, demanding yet higher power consumption, involves an analysis whether there is an IoT device in front of the user, that there is a command, and that the command is an applicable command for that IoT device.

Overall, the proposed technology allows a truly intuitive way to select and control IoT devices, the pairing is implicit, and requires a minimum (if any) manual interaction. The latter is valuable for users carrying things in the hands or for physically impaired users.

Some advantages of the teachings herein are ease and speed of use. Any IoT device can be addressed by looking at it/towards it and using a command such as words (or possibly gestures) that make sense for that specific IoT device. For example, to turn on a lamp the user only has to look in the general direction of the lamp and say "turn on", or to start the TV the user looks towards the TV and says "turn on". For a speech impaired person even a nod might be enough as a positive acknowledgement to turn on the TV. There is no need for the user to pre-pair devices as long as it has the right to control the device.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 1A:
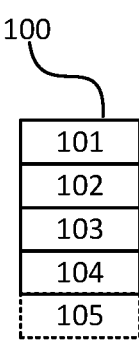
FIG. 1A shows a schematic view of a user interface arrangement according to an embodiment of the present invention.

FIG. 1A shows a schematic view of a user interface arrangement 100 according to an embodiment of the present invention. The user interface arrangement 100 comprises a controller 101, a memory 102, a communication interface 103, and a sensor 104.

The controller 101 is configured to control the overall operation of the user interface arrangement 100. In one embodiment, the controller 101 is a general purpose controller. As a skilled person would understand there are many alternatives for how to implement a controller, such as using Field—Programmable Gate Arrays circuits, ASIC, GPU, etc. in addition or as an alternative. For the purpose of this application, all such possibilities and alternatives will be referred to simply as the controller 101.

It should also be noted that in one embodiment, parts of or all of the processing of the controller is performed remotely, where a local controller 101 is configured to provide input data to a remote processing unit, such as in a cloud server, causing the remote processing unit to perform the processing and receiving the results of such processing as output from the remote processing unit. For the purpose of this application, such possibilities and alternatives will also be referred to simply as the controller 101, the controller thus representing both the local controller 101 and the remote processing unit.

The memory 102 is configured to store command data, device settings and computer-readable instructions that when loaded into the controller 101 indicates how the user interface arrangement 100 is to be controlled. The memory 102 may comprise several memory units or devices, but they will be perceived as being part of the same overall memory 102. There may be one memory unit for the image presenting device storing graphics data, one memory unit for the sensor 104 for storing settings, one memory for the communications interface for storing settings, and so on. As a skilled person would understand there are many possibilities of how to select where data should be stored and a general memory 102 for the user interface arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

In one embodiment the controller 101 and the memory 102 are divided into a main processing unit and a background processing unit, where the background processing unit is arranged to run in an ultra-power-saving mode and being configured to wake up the main processing unit as needed, when an event warranting such a wake-up is detected or encountered.

The user interface arrangement 100 is arranged with a communication interface 103. The communication interface 103 is arranged to enable communication with other devices, such as an internet of things device (not shown in FIG. 1A, 1B or 1C, but referenced 210, 22, and 230 in FIG. 2A) for controlling the internet of things device or a server (not shown) for receiving content, instructions and/or settings or other data.

The communication interface 103 comprises a radio frequency (RF) communications interface. In one embodiment the communication interface 103 comprises a Bluetooth™ interface, a WiFi™ interface, a ZigBee™ interface, a RFID™ (Radio Frequency IDentifier) interface, Wireless Display (WiDi) interface, Miracast interface, and/or other RF interface commonly used for short range RF communication. In an alternative or supplemental such embodiment the communication interface 103 comprises a cellular communications interface such as a fifth generation (5G) cellular communication interface, an LTE (Long Term Evolution) interface, a GSM (Global Systéme Mobilé) interface and/or other interface commonly used for cellular communication.

The communication interface 103 may also or alternatively be based on visible light communication (VLC).

The communication interface 103 may also be wired. The communication interface 103 may comprise several interfaces.

The sensor 104 is arranged to provide input from a user. In one embodiment the sensor 104 comprises an audio input device, such as a microphone, for registering sound waves. In such embodiment the input is audio (comprising words). The audio input device 104 is configured to run in a low power mode, simply registering any incoming sound waves and storing them in a buffer being comprised in the memory 102. The audio input device 104 is further configured to analyze the incoming sound waves to determine if the sound waves comprise any spoken (or otherwise uttered) words. This analysis is performed through a processing of the sound waves physical characteristics, such as frequency analysis, time above a specific amplitude, and so on. Such low power mode usually only requires very low wattages to run, and enables the user interface arrangement 100 to run in a first power level mode wherein the power consumption is minimal. It should be noted that a power level herein refers to an average power level. Alternatively or additionally a power level herein refers to a maximum power level.

The processing stated above to be performed by the audio input device 104 may be performed by a controller comprised in the audio input device 104 or by the general controller 101 of the user interface arrangement 100. For the purpose of this application, there will be made no difference between an audio input device controller and the general controller 101. The buffering stated above to be performed by the audio input device 104 may be done in a memory comprised in the audio input device 104 or in the general memory 102 of the user interface arrangement 100 as indicated above. For the purpose of this application, there will be made no difference between an audio input device memory and the general memory 102.

In an alternative or supplemental embodiment the sensor 104 comprises a light input device, such as an ambient light sensor or a camera, for registering light waves.

The user interface arrangement 100 may optionally comprise a user interface 105 for receiving commands from a user through. Such user interface 105 may also be arranged to provide data or information to a user through.

In one embodiment, the user interface 105 comprises one or more buttons. One such button may be arranged to activate the user interface arrangement 100, or a particular function in the user interface arrangement 100, upon receiving a touch input.

It should be noted that the user interface arrangement 100 may comprise a single device or may be distributed across several devices and apparatuses.

It should be noted that the teachings herein find use in user interface arrangements 100 in many areas of devices capable of acting as internet of things devices, such as smart phones, tablet computers, smart watches, media devices (such as TVs and music players), or appliances (such as lamps, refrigerators, fans, or doors) to mention a few examples. In one embodiment the user interface arrangement 100 is a wearable device.

Figure 1B:
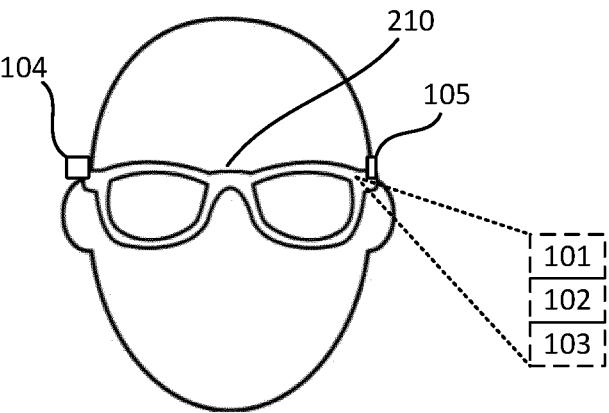
FIG. 1B shows a schematic view of a user interface arrangement according to an embodiment of the present invention.

FIG. 1B shows a schematic view of a user interface arrangement 100 being a wearable device 100 according to an embodiment of the present invention. In the embodiment shown, the wearable device 100 are (smart) glasses 100. Alternatively or additionally, the wearable device 100 is a headset 100. In both these examples, the wearable device 100 is designed to be worn on the head of a user. This allows for directing the wearable device 100 in a general direction that the user is looking at.

Other examples of wearable devices are brooches, tags or other device that can be worn on the clothes of a user, such as on the chest of a user. This also allows for directing the wearable device in a general direction that the user is looking at, but at a lower accuracy or requiring that the user actually turns toward what is being looked at.

Figure 1C:
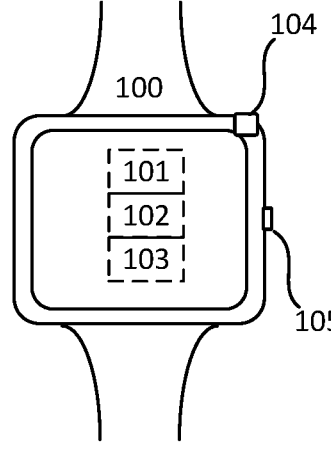
FIG. 1C shows a schematic view of a user interface arrangement according to an embodiment of the present invention.

FIG. 1C shows a schematic view of a user interface arrangement 100 being wearable device 100 according to an embodiment of the present invention. In this example, the wearable device 100 is a smart watch to be worn by a user, presumably on a wrist of the user, a smart watch being one example of a wrist worn device. This allows for the user to indicate a direction that the user is interested in, by simply pointing (as in raising the arm carrying the watch) in that direction. Other examples of wrist worn devices are bracelets.

In the following, simultaneous reference will be made to the user interface arrangements 100 of FIGS. 1A, 1B and 1C.

Figure 2A:
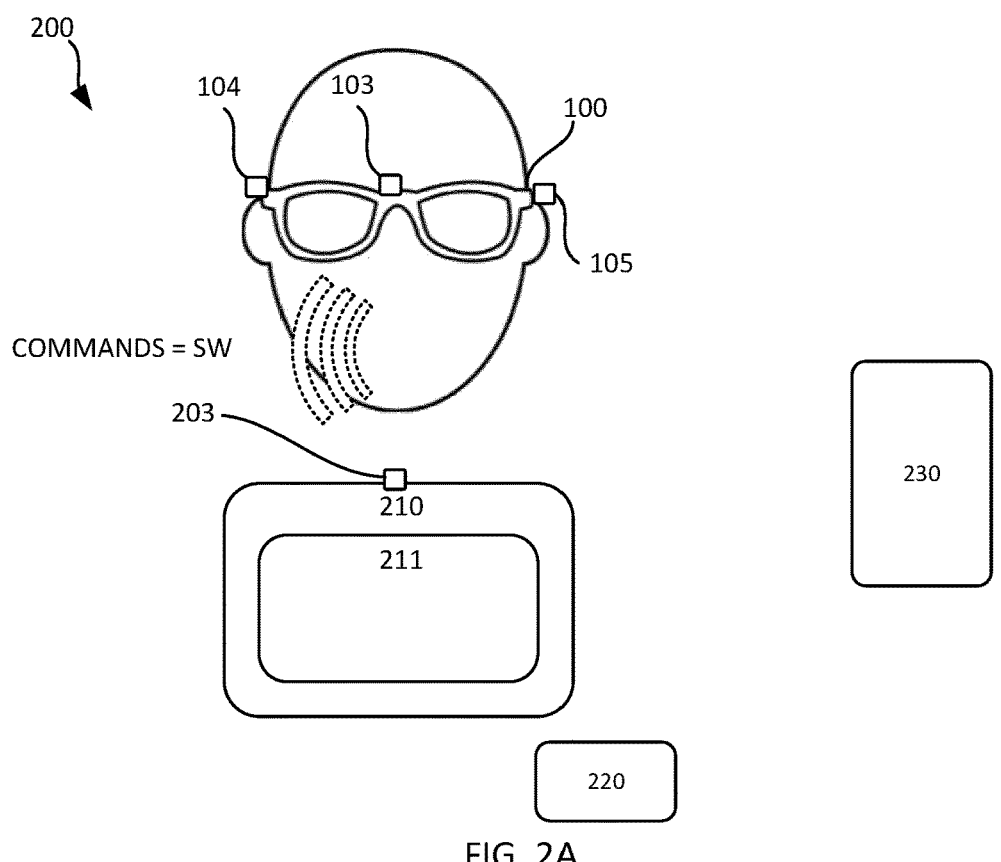
FIG. 2A shows a schematic view of user interface arrangement system according to one embodiment of the teachings herein.

FIG. 2A shows a schematic view of a system 200 according to the teachings herein. The system 200 comprise a user interface arrangement 100. In this example one user interface arrangement 100 is shown exemplified by a wearable device 100 as disclosed in relation to FIG. 2B, being a pair of smart glasses 100. Also shown in FIG. 2A is one or more devices adapted for use as internet of things (IoT) devices 210, 220, 230. In the example of FIG. 2A, there are three IoT devices 210, 220, 230. At least some of the IoT devices are arranged with a communication interface 203 corresponding to the communication interface 103 of the glasses 100. In this example, one of the IoT devices is a TV set 210 having a screen 211 and a Bluetooth™ interface 203. The exact nature of the IoT device is not important to the teachings herein and the teachings herein may be equally applicable to all or at least most IoT devices.

As discussed in relation to FIG. 1A, the user interface arrangement 100, i.e. the glasses 100, is arranged with a sensor 104, in this example an audio input device 104, and a communication interface 103, in this example a Bluetooth™ interface 103.

The improved user interface 105 provided according to the teachings herein will be discussed in relation to FIGS. 2A to 2F and FIG. 3, FIG. 3 showing a flowchart for a general method according to the teachings herein. The method corresponds to the operation of the user interface arrangement 100 as discussed herein.

As is also discussed in relation to FIG. 1A, the glasses 100 may also comprise a user interface 105 comprising at least one button 105. In one embodiment the button 105 is pushed in order to activate 300 the glasses 100 to start monitoring for user commands for IoT devices. The controller 101 is thus configured to receive user input to activate 300 a monitoring mode. Entering the monitoring mode causes the audio input device 104 to start receiving and monitoring sound waves and causes the glasses 100 to enter 305 a first power level. Alternatively or additionally the user command to start monitoring is received in another manner, for example through gestures in front of a light sensor comprised in the sensor 104, through gestures effected through motion and detected by an inertial movement unit (IMU) comprised in the sensor 104 (gestures being the input received by the sensor in such embodiments) or through commands received through the communication interface 103.

Figure 3:
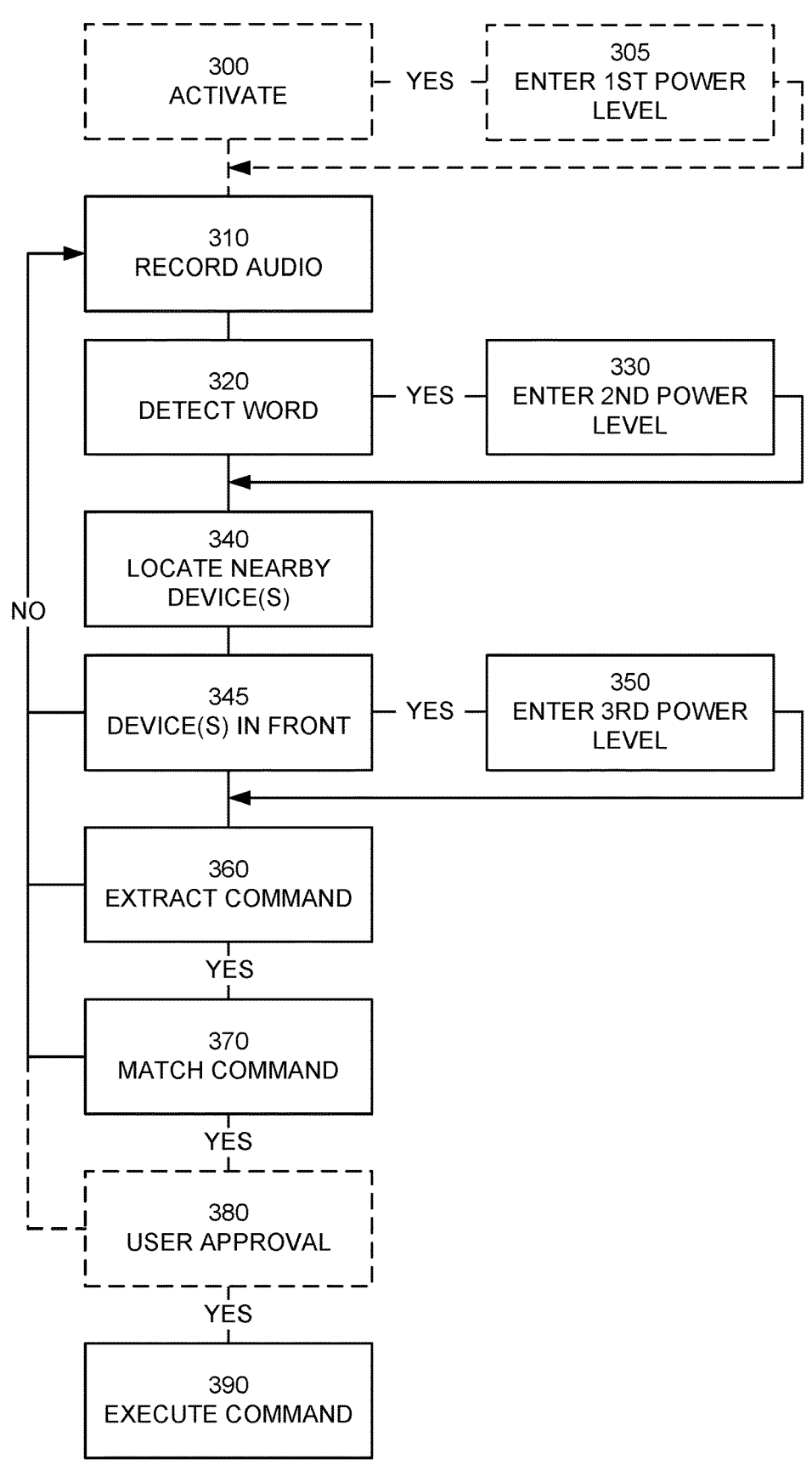
FIG. 3 shows a flowchart of a general method according to an embodiment of the present invention.

Alternatively or additionally, the glasses 100 are already in the monitoring mode (perhaps as part of a default idle mode) running in the first power level and no specific activation is needed—as is indicated by the dashed lines for 300 and 305 in FIG. 3. The first power level enables the audio input device 104 to operate, but not (necessarily) the communication interface 103, at least not continuously. In embodiments where activation is done through power intensive components, such as a camera or RF interface, those components are thus put in a sleep mode (at least temporarily) in order to enable the low first power level.

In this monitoring mode, a user may utter or speak command phrases aimed at a desired IoT device. The command phrases may comprise one or more commands, and the command(s) may be specific to an IoT device or they may be accompanied by an identifier for the IoT device the command(s) is intended for.

Table 1 below shows a simplified grammar for command phrases, where the notation TERM+ indicates one or more TERMs and TERM* indicates zero or more TERMs

| PHRASE = IDENTIFIER* COMMAND+ |
| IDENTIFIER = TYPE or ID |
| ID = NAME or BRAND NAME |
| EXAMPLES |
| --- |
| 1: TV TURN ON      IDENTIFIER = TV; COMMAND1 = TURN COMMAND2 = ON |
| 2: LAMP OFF      IDENTIFIER = LAMP; COMMAND = OFF |
| 3: B&O PLAY      IDENTIFIER = B&O; COMMAND = PLAY |

A phrase may thus comprise zero or more identifiers followed by one or more commands. An identifier may be a type (TV or LAMP) or they may be an assigned identifier (ID) which may be a name or a brand name. The identifier may be assigned by a user or it may be specified in the IoT device upon delivery.

The commands that an IoT device is capable of performing may similarly be assigned by the user or they may be specified in the IoT Device upon delivery, or both.

The three examples given are thus to 1: turn on a TV; 2: turn off a lamp; and 3: to start playing for example music on a music player by the brand B & O®.

The use of identifiers enable for the same command to be used by several IoT devices. If an action is only available for one IoT device, an identifier would then not be needed.

FIG. 2A shows a user uttering a command phrase which is output as soundwaves SW.

As briefly discussed in the above, the low energy monitoring of sound waves also includes buffering the recording of the sound waves. It should be noted that the monitoring of sound waves does not include advanced analysis of the soundwaves or what possible words they represent, but is a mere monitoring or recording of physical soundwaves along with a basic analysis of those soundwaves. The basic analysis is an analysis of the soundwaves physical characteristics, and not to the intended content of the words propagated by the soundwaves. The analysis aims at differentiating noise from spoken words. This may be done through determining that portions of the sound recording are within a frequency range corresponding to spoken words, for example in the range of 300 Hz to 3400 Hz, or 125 Hz to 8000 Hz. Such portion in a frequency range corresponding to a word is thus indicative of a word. Furthermore, the determination may be based on the portion being of a duration in that frequency range corresponding to the length of a spoken word such as having a duration of a mere second up to several seconds in case of more complex set of phonemes used, such as 1 to 4 seconds for example. Too short of a duration for the portion and the portion most likely does not correspond to a command, and too long a duration the portion most likely does not correspond to a clearly discernible command. Additionally, the determination may also be based on the portion being within an amplitude range corresponding to spoken words by the user, such as having a sound pressure from 2000 micro Pascals for a soft whispering to beyond the sound pressure of a normal conversation at around 20000 micro Pascal, or alternatively or additionally in the range of 40 dB to 80 dB. A portion that is too low in amplitude is most likely not spoken or originated from the user, or not meant as a command.

Additionally, the determination may also be based on the portion being in a sequence of such portions corresponding to a sequence of command words, for example 1, 2, 3, 4 or more words. If a specific command structure is used (for example an identifier followed by a two word command) a sequence of three portions would be indicative of a command.

Such an analysis or determination may be performed by analog filters or digital filters, thus requiring only a minimum of power.

A spatial filtering may be utilized by the controller 101 to avoid recording distant voices or background audio/noise, by applying a frequency filter (putting emphasis on audio typical for human spoken words) and a sound level threshold. Furthermore, a directed audio device may also be employed suppress unwanted audio or noise coming from directions not corresponding to the mouth of the user during normal use. It should be noted that during this monitoring the full capacity of the controller 101 may not be needed and the analysis may be done by a controller specific to the audio input device 104, but seen as part of the controller 101 herein.

Figure 2B:
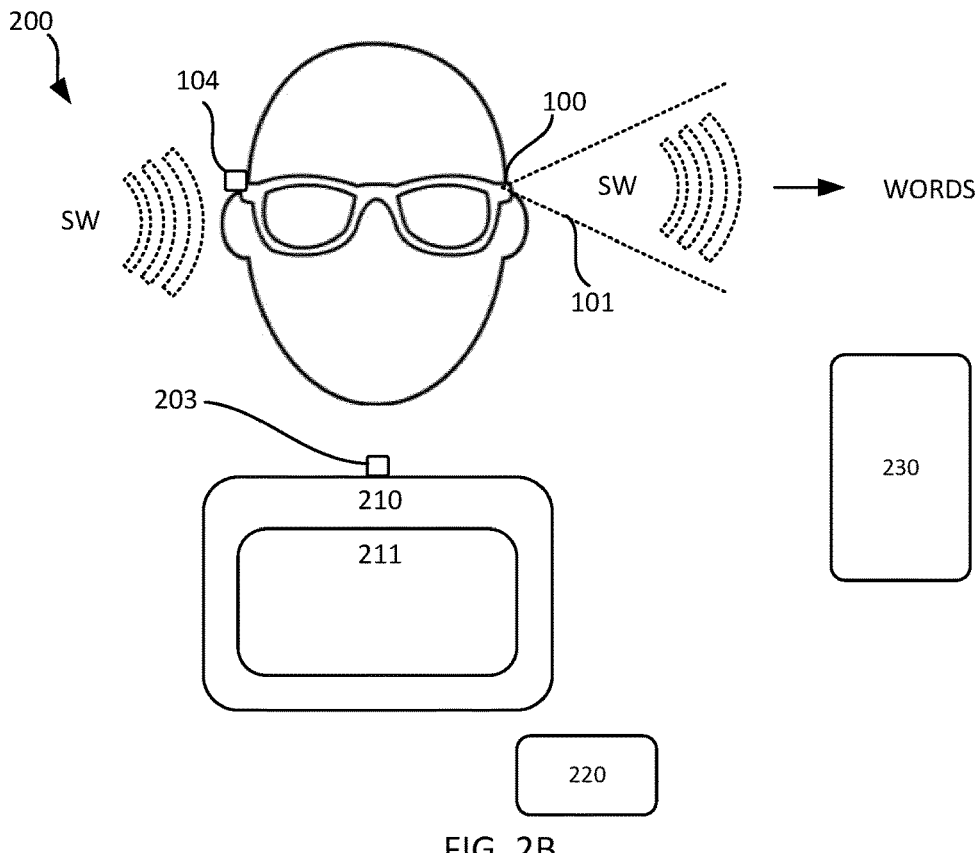
FIG. 2B shows a schematic view of the user interface arrangement system of FIG. 2A being used according to one embodiment of the teachings herein.

FIG. 2B shows a schematic view of the system 200 of FIG. 2A wherein the audio input device 104 receives the sound waves SW which are recorded (and buffered) 310 and the controller 101 analyses these to determine or detect 320 if a spoken word is part of the sound propagated by the sound waves SW. The detection of words being one example of an indication of a command being detected.

If so, the glasses 100 enter 330 a second power level. The second power level is higher than the first power level and enables the communication interface 103 to operate, at least in a passive monitoring or scanning mode. In comparison the first power level is lower than is required by the communication interface to operate to perform the functions described herein, such as the passive monitoring mode.

Figure 2C:
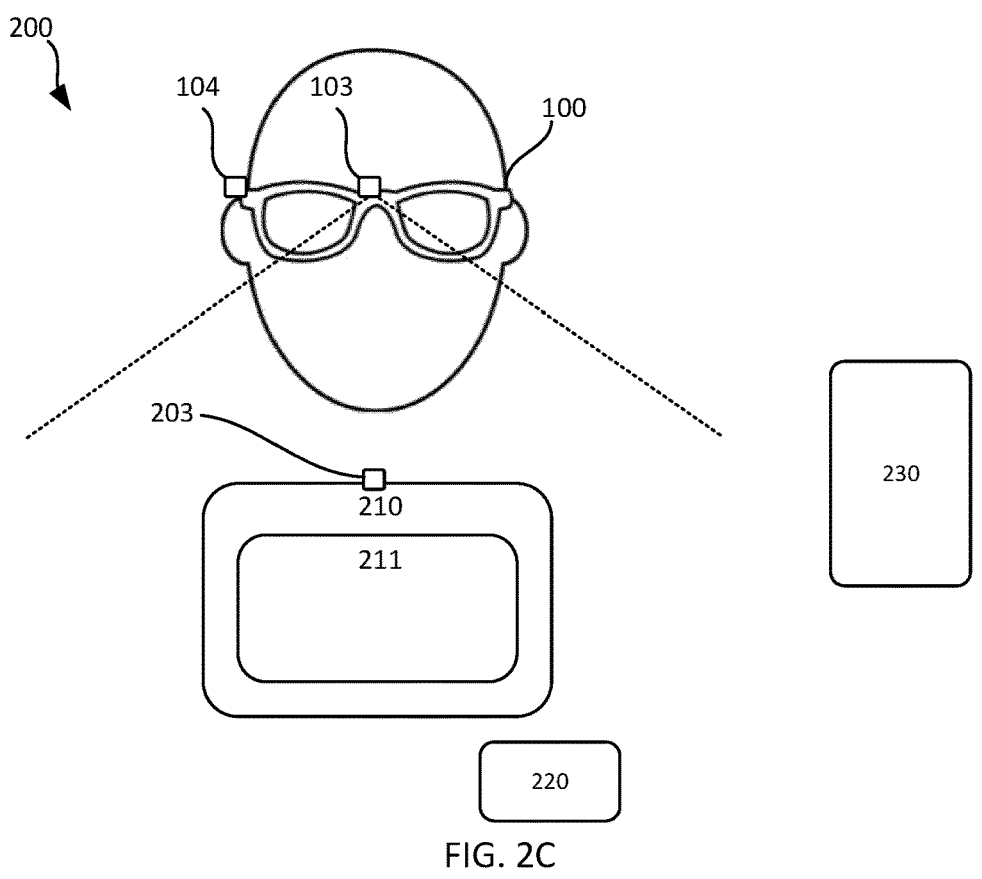
FIG. 2C shows a schematic view of the user interface arrangement system of FIG. 2A being used according to one embodiment of the teachings herein.

The glasses 100 now employs the communication interface 103 to scan for incoming signals in order to locate 340 any nearby IoT devices. In one embodiment, this is done by instructs the communication interface 103, for example a Bluetooth 5.1 interface, to start collecting information about nearby IoT devices (for example by listening for Bluetooth™ beacons). As the communication interface 103 scans, the communication interface 103 may encounter several nearby IoT devices 210. These IoT devices' communication interfaces 203 are of a corresponding type. In the example of Bluetooth 5.1, the communication interfaces 203 of the IoT devices 210, 220, 230 include support for the Bluetooth direction-finding (BT DF) feature aka AoA (Angle of Arrival) and/or AoD (Angle of Departure) functionalities. Such functionalities operate accordingly; based on the position of the glasses 100, the pose (direction the head is looking at) and gaze (if available) provides a general direction (a three dimensional cone-of-interest (AoA or AoD) with its center being start of the boresight of the antenna of the communication interface 103 can be calculated and compared with the list of IoT device positions or areas of interest. This is illustrated by the dotted lines in FIG. 2C showing a schematic view of the system 200 of FIG. 2A when searching for nearby IoT devices. The width and extent of the cone-of-interest horizontally and vertically depends on the resolution given by the direction finding system (lower accuracy resulting in a wider cone).

If there are no IoT devices 210, 220, 230 that satisfy all of the above conditions, the glasses 100 returns to its initial monitoring mode operating in the first low power level.

If there are IoT devices 210, 220, 230 that satisfy all of the above conditions, i.e. if there are device(s) in front of the glasses 100 (block 345), the glasses 100 enters 350 a third power level. The third power level enables advanced analysis of spoken words and active communication through the communication interface 103. Such an advanced analysis may even require that a (network) connection to a remote server is established for performing the analysis remotely. Such connections to remote servers most likely requires a communication standard requiring a higher power level than short range communication standards such as Bluetooth® requires. In comparison the second power level is lower than is required by the extraction of words.

Figure 2D:
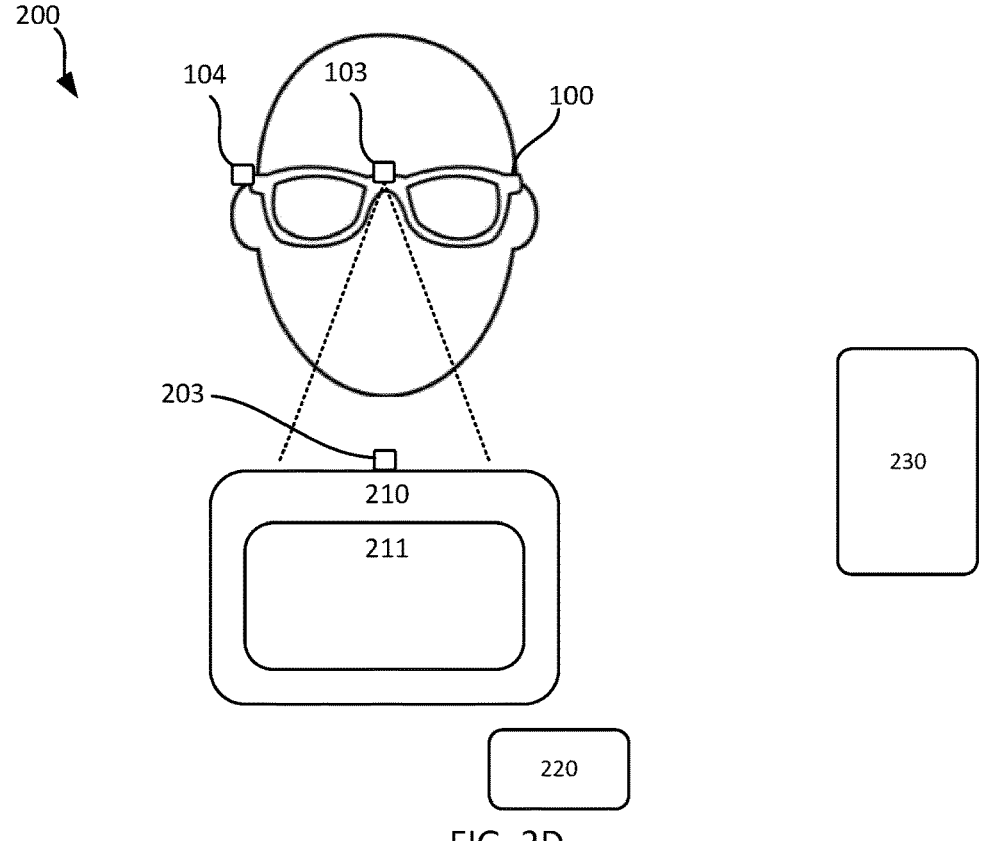
FIG. 2D shows a schematic view of the user interface arrangement system of FIG. 2A being used according to one embodiment of the teachings herein.

FIG. 2D shows an example where two IoT devices are found to be nearby the glasses 100. Any of the IoT devices 210, 220 in front of the user and within the cone-of-interest are candidate IoT devices that might be addressed by the user. In this example there are two such IoT devices, the TV 210 and another IoT device 220, for example a lamp.

Figure 2E:
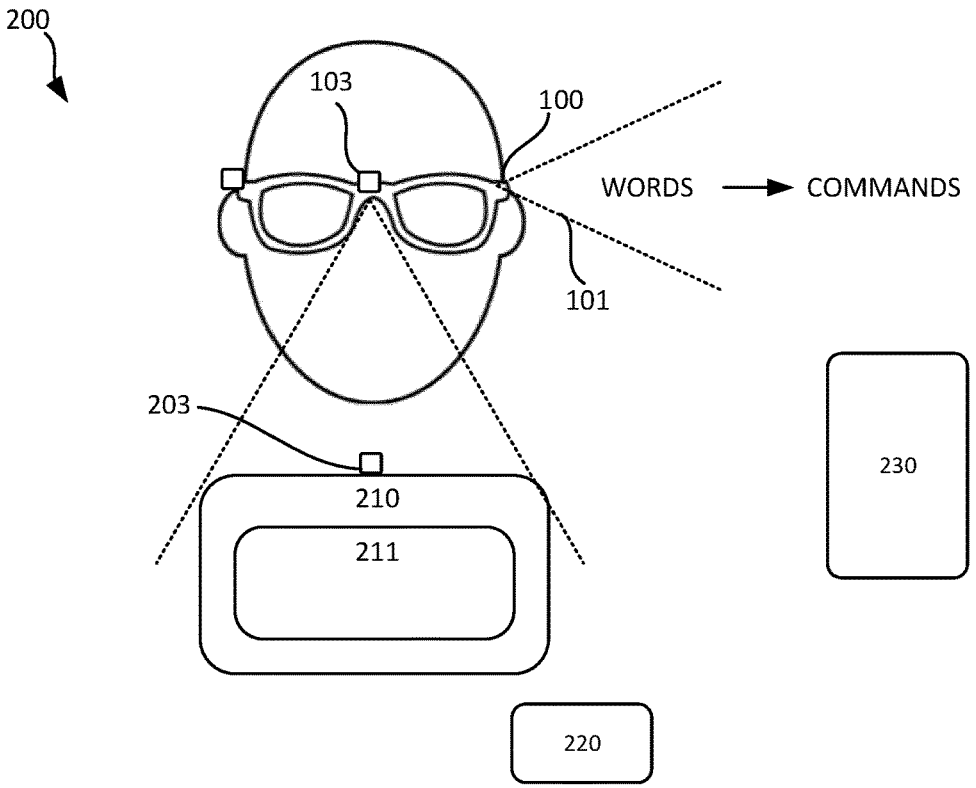
FIG. 2E shows a schematic view of the user interface arrangement system of FIG. 2A being used according to one embodiment of the teachings herein.

In order to select an intended IoT device, the controller 101 is configured to retrieve the buffered recording of the sound wave, which has been determined to comprise words, and perform speech analysis (or other analysis) to determine if the words correspond to a command phrase. This is done by extracting 360 at least a command and match 370 the extracted command(s) to the commands applicable to the IoT device located as being in front of the glasses 100. FIG. 2E shows a schematic view of the system of FIG. 2A where the commands are extracted. As part of the matching of commands, a matching of any identifiers may also be performed, and for this reason there is made no difference between an identifier and a command. In one aspect, an identifier may be seen as an optional command, i.e. a word that may not need to be present in the command sequence for providing a (partial) match, such a (partial) match being considered as a match even if technically not a perfect match. This allows for shorter commands being given in situations where a command is only applicable to one IoT device, or where an IoT device has already been selected (more on this later).

The applicable commands may be stored in the memory 202 of the corresponding IoT device 210, 220. In such an embodiment, the IoT Device may be queried for its applicable commands and the controller 101 of the glasses 100 perform the matching. Alternatively or additionally, the IoT device is queried for a match where the command(s) is provide to the IoT device and the controller of the IoT device 210, 220 performs the matching. This could also include an automatic execution of the commands if a match is found.

Alternatively or additionally the applicable commands may be stored in the memory 102 of the glasses 100 for the corresponding IoT device 210, 220, wherein the controller 101 of the glasses 100 performs the matching. Alternatively or additionally the applicable commands may be stored in a remote server (not shown) which is contactable through the communication interface 103 of the glasses 100. In such embodiments, the applicable commands may be received by the glasses 100 for matching, or the matching may be done by the server, and the glasses 100 receiving an acknowledgement for the matching.

If no commands are extracted, the glasses 100 may return to the monitoring mode in the first power level. Similarly, if no commands are matched, the glasses 100 may return to the monitoring mode in the first power level.

Here several situations may occur, depending on the number and type of IoT devices in front of the glasses 100.

If there is one, and only one, IoT device, that IoT device is likely to be the IoT device being addressed and intended to receive a command, and in this situation the matching of the extracted command(s) to applicable commands is merely a confirmation that the commands are applicable.

If there are multiple devices within the boundary of the cone-of-interest, the selection of the intended IoT device can be made according to one of several different schemes. One approach would be to select the closest device that has a spatial or range match along the user device boresight, and then confirm that the commands are applicable (matches commands for the IoT device). Another approach is to defer that selection to the matching of the extracted command, and select IoT the device that provides the best match, yet another alternative or additional approach is also be based on historical choices. For example, the user always turns on the TV (which automatically starts the stereo placed under the TV using HDMI commands) and so even if there are two devices that support "turn on" it is very likely that the user means the TV. If the user at any time is trying to actually start only the stereo the system will from that point on learn that it needs to give the user the choice when future commands are issued. One way of learning that is that the user issues a new "turn on" command directly after the first one (that was sent to the TV) and since the TV is already on the system understands that the user means the stereo.

Figure 2F:
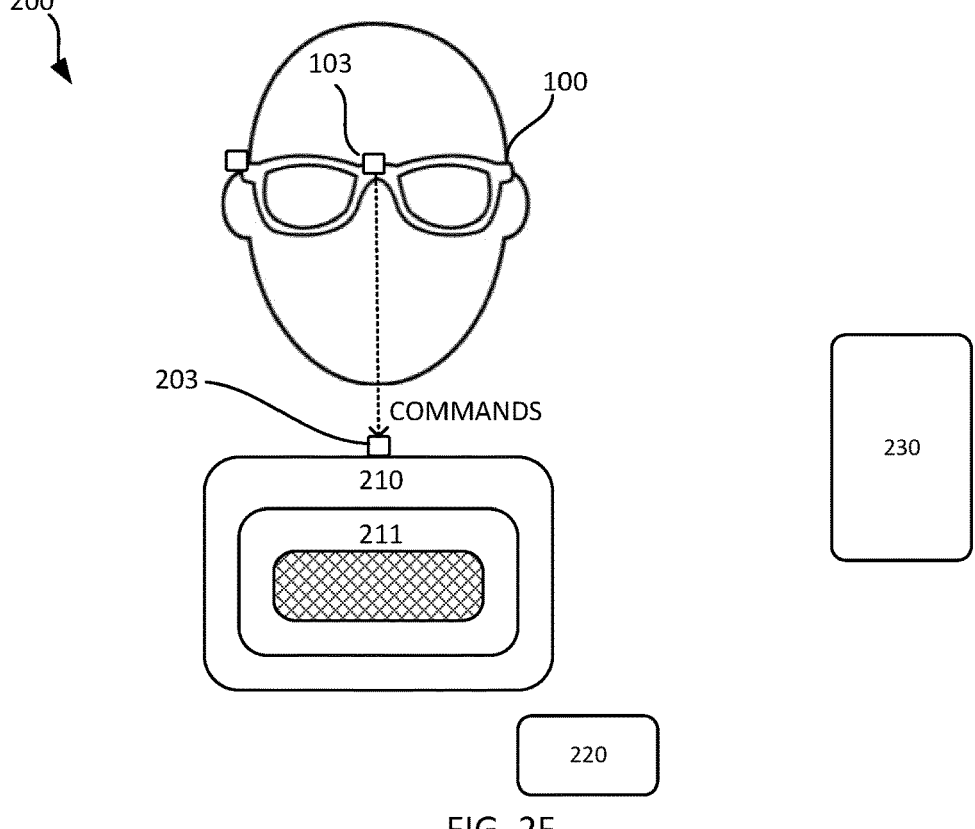
FIG. 2F shows a schematic view of the user interface arrangement system of FIG. 2A being used according to one embodiment of the teachings herein.

As a match has been performed providing an IoT device 210 whose set of applicable commands matches the extracted command, the glasses 100 causes the IoT device 210 to execute 390 the command. This is shown in FIG. 2F showing a schematic view of the system of FIG. 2A where a command is being transmitted to the IoT device 210, which in turn reacts by executing the command—as is illustrated in FIG. 2F by the screen 211 of the TV 210 changing appearance.

In one embodiment, the glasses 100 may require a user acknowledgement (user approval 380) that the selected IoT device is the intended IoT device. Such acknowledgement may be provided through further voice input through the audio input device 104 or through user input through the user interface 105 (if such is present).

In one embodiment, a selected IoT device stays selected even after the command has been executed, and any further received commands are automatically matched with the IoT device, thereby skipping the locating of nearby devices. In such embodiments, the user interface arrangement 100 enters 350 straight into the third power level when a word is detected 320.

Figure 4:
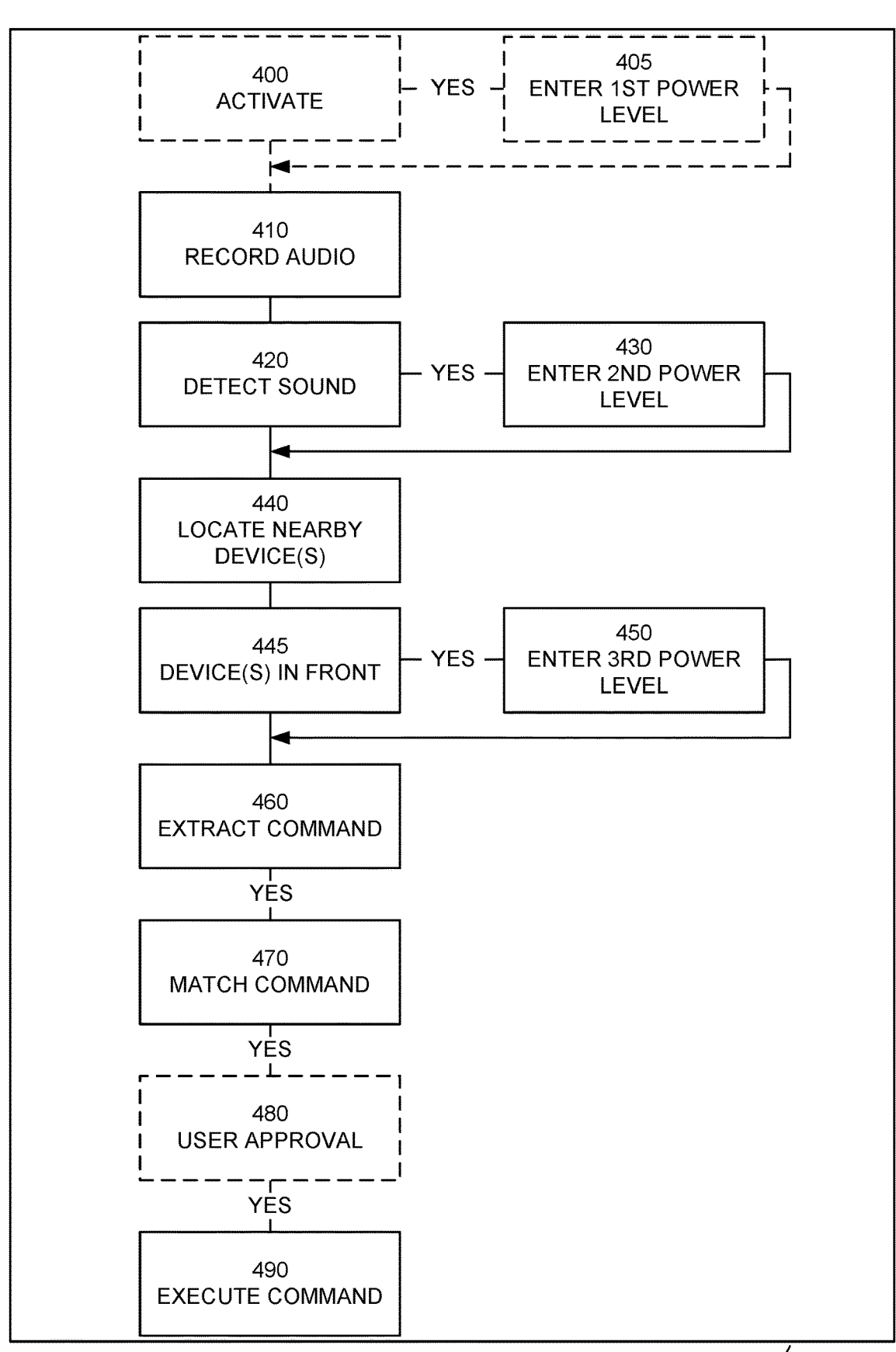
FIG. 4 shows a component view for a software component arrangement according to an embodiment of the teachings herein.

FIG. 4 shows a component view for a software component or module arrangement 400 according to an embodiment of the teachings herein. The software component arrangement 400 is adapted to be used in a user interface arrangement 100 as taught herein for providing a user interface 105 as taught herein and corresponds to the operation of the user interface arrangement 100 as discussed in the above. The user interface comprises a sensor 104 and a communication interface 103, wherein the sensor 104 is arranged to receive input. The software component arrangement 400 comprises: a software component for causing the user interface arrangement 100 to operate in a first power level; a software component for receiving 410 said input SW; a software component for detecting 420 an indication of at least one command, and in response thereto cause the user interface arrangement 100 to operate 430 in a second power level, wherein the second power level is higher than the first power level; a software component for determining 445 that at least one IoT device 210, 220, 230 is in front of the user interface arrangement 100, and in response thereto cause the user interface arrangement 100 to operate in a third power level, wherein the third power level is higher than the second power level; a software component for extracting 460 at least one command from the input; a software component for matching 470 the extracted at least one command to the at least one IoT device 210, 220, 230, and if a match is found; a software component for executing 490 (optionally as indicated by the dashed lines, when user approval 480 has been received) the extracted at least one command on the matching IoT device 210, 220, 230.

For the context of the teachings herein a software component may be replaced or supplemented by a software module. The user interface arrangement 400 may also comprise further software components enabling the user interface arrangement 400 to perform other functionalities of the method discussed in relation to FIG. 3.

Figure 5:
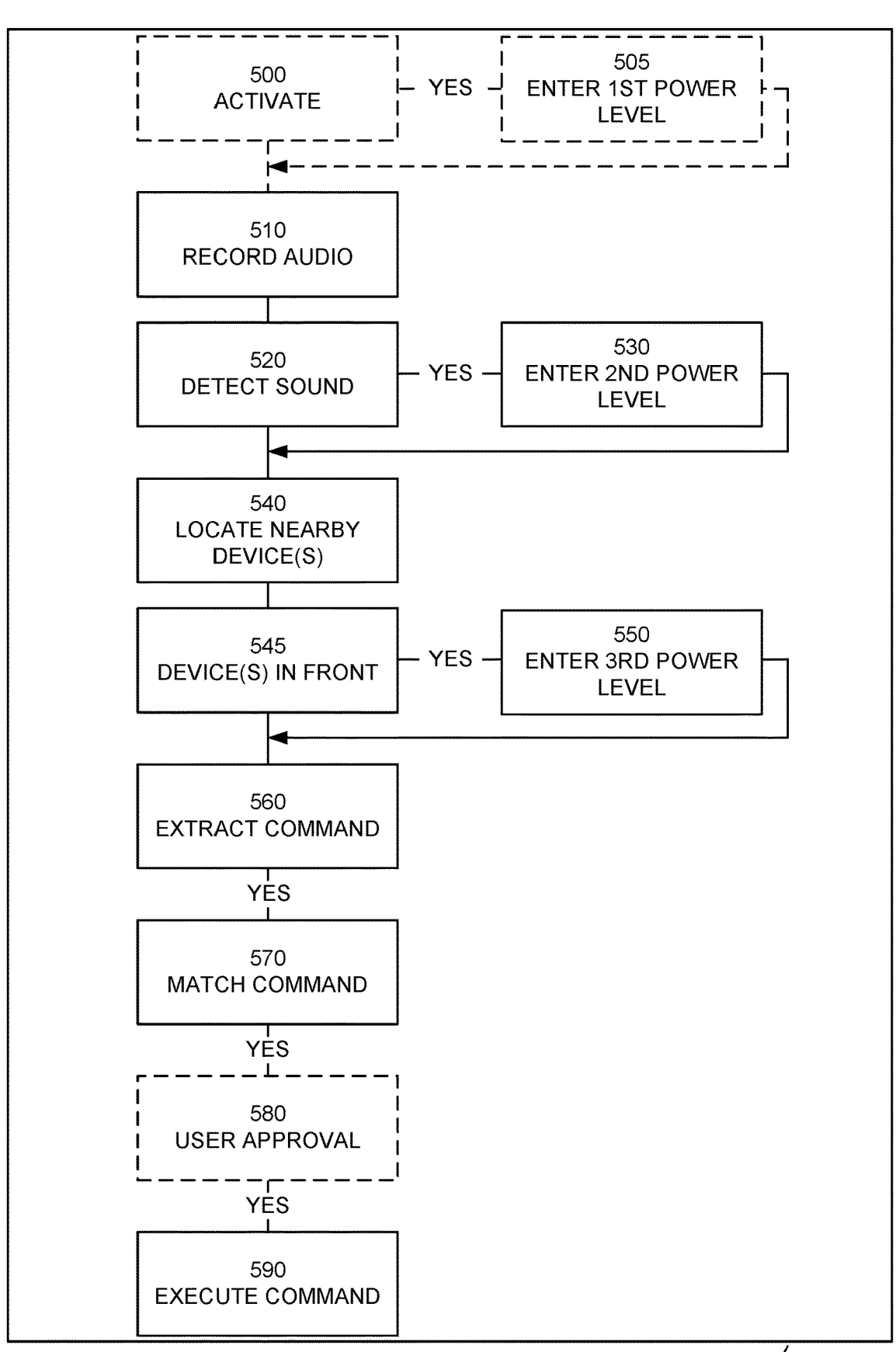
FIG. 5 shows a component view for an arrangement comprising circuits according to an embodiment of the teachings herein.

FIG. 5 shows a component view for a user interface arrangement 500 comprising circuitry according to an embodiment of the teachings herein. The user interface arrangement comprising circuitry 500 is adapted to be used in a user interface arrangement 100 as taught herein and corresponds to the operation of the user interface arrangement 100 as discussed in the above. The circuitry arrangement 500 is arranged for a user interface arrangement 100 comprising a sensor 104 and a communication interface 103, wherein the sensor 104 is arranged to receive input. The user interface arrangement 500 of FIG. 5 comprises circuitry for causing the user interface arrangement 100 to operate in a first power level 505; circuitry for receiving 510 said input SW; circuitry for detecting 520 an indication of at least one command, and in response thereto cause the user interface arrangement 100 to operate 530 in a second power level, wherein the second power level is higher than the first power level; circuitry for determining 545 that at least one IoT device 210, 220, 230 is in front of the user interface arrangement 100, and in response thereto cause the user interface arrangement 100 to operate 550 in a third power level, wherein the third power level is higher than the second power level; circuitry for extracting 560 at least one command from the input;

circuitry for matching 570 the extracted at least one command to the at least one IoT device 210, 220, 230, and if a match is found; circuitry for executing 590 the extracted at least one command on the matching IoT device 210, 220, 230 (optionally as shown by the dashed lines, when user approval 580 has been received).

The user interface arrangement 500 may also comprise further circuitry enabling the user interface arrangement 500 to perform other functionalities of the method discussed in relation to FIG. 3.

As indicated in the general description above, variations may exist for the embodiments disclosed, and some such variant embodiments will be discussed in the below.

Alternatives for activating 300 the monitoring mode are

The user holds head still for a short duration of time, e.g. 3 seconds, which may be detectable through an inertia sensor comprised in the sensor 104.

The user nods (or tilt upwards of the head, or any other such simple head gesture), potentially in combination with holding head still for a short duration (e.g. 1 second before the nod) which may be detectable through an inertia sensor comprised in the sensor 104.

The user holds head still for a short during of time (e.g. 1 second) which may be detectable through an inertia sensor comprised in the sensor 104 followed by a voice command (no voice command during the initial holding-still period)

The user nods (which may be detectable through an inertia sensor comprised in the sensor 104) at the same time as expressing a voice command The user has a hand-tracking sensor, e.g. a smartwatch as in FIG. 1C and does a point-gesture with the hand (which may be detectable through an inertia sensor comprised in the sensor 104) at the same time, or shortly followed by, a voice command.

In the above, the focus has been on providing the commands by spoken words. However, the commands may also or alternatively be provided through gestures. In such embodiments, the audio input device 104 is supplemented or replaced by a motion sensor 104.

In one embodiment the selection of a IoT device may be performed by listing or otherwise presenting the located IoT devices on a screen or other user interface element of the User Interface Arrangement (UIA) 100 and the user can select the intended IoT device from the list of located IoT devices. Possibly, the commands for the selected IoT device may then or also be presented through the user interface 105.

The functions of above proposed invention can be implemented in a single device, e.g. a highly capable smart-glasses containing directional Bluetooth, always-on very power-efficient audio recording subsystem, key function of the IoT controlling software, and voice recognition software to detect words and sentences of spoken language. However, these functions can also be distributed among several devices and units: The Bluetooth AoA or AoD function can be handled by normal glasses, the most sophisticated spoken language analysis functions can be handled by centralized servers in the Mobile Edge or over internet, the always-on audio subsystem managing Phase 1 and the initial triggering mechanism can be in a Smartwatch, whereas the rest of the functions can reside in a Smartphone of the user.

Figure 6:
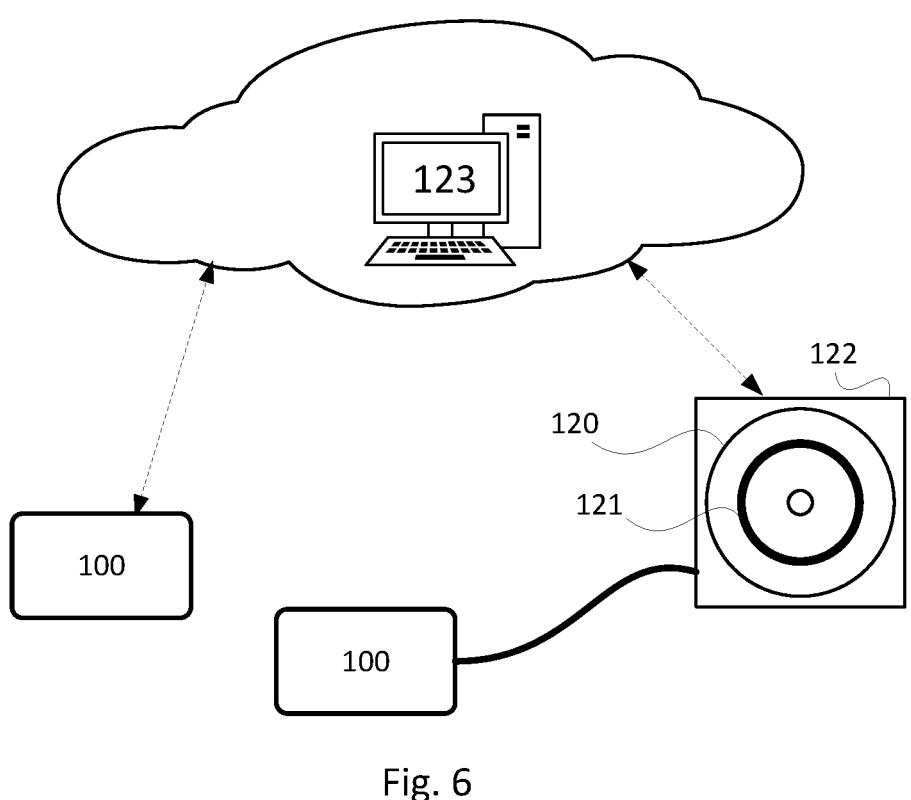
FIG. 6 shows a schematic view of a computer-readable medium carrying computer instructions that when loaded into and executed by a controller of an arrangement enables the arrangement to implement an embodiment of the present invention.

FIG. 6 shows a schematic view of a computer-readable medium 120 carrying computer instructions 121 that when loaded into and executed by a controller of a user interface arrangement 100 enables the user interface arrangement 100 to implement the teachings herein.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 6, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the user interface arrangement 100 for being executed by the controller 101.

The computer disc reader 122 may also or alternatively be connected to (or possibly inserted into) a user interface arrangement 100 for transferring the computer-readable computer instructions 121 to a controller of the user interface arrangement 100 (presumably via a memory of the user interface arrangement 100).

FIG. 6 shows both the situation when a user interface arrangement 100 receives the computer-readable computer instructions 121 via a server connection and the situation when another user interface arrangement 100 receives the computer-readable computer instructions 121 through a wired interface. This enables for computer-readable computer instructions 121 being downloaded into a user interface arrangement 100 thereby enabling the user interface arrangement 100 to operate according to and implement the invention as disclosed herein.

The invention claimed is:

1. A user interface arrangement comprising a controller, a sensor and a communication interface, wherein the user interface arrangement is a pair of glasses, wherein the sensor is arranged to receive input, and wherein the controller is configured to:

cause the user interface arrangement to operate in a first power level;

receive the input while operating the user interface arrangement in the first power level;

detect an indication of at least one command, and in response thereto cause the user interface arrangement to operate in a second power level, wherein the second power level is higher than the first power level;

while operating the user interface arrangement in the second power level, determine that at least one Internet of Things (IoT) device is in front of the user interface arrangement and within a three-dimensional cone having a center located at the user interface arrangement, and in response thereto cause the user interface arrangement to operate in a third power level, wherein the third power level is higher than the second power level;

while operating the user interface arrangement in the third power level, extract at least one command from the input;

match the extracted at least one command to the at least one IoT device, and if a match is found:

execute the extracted at least one command on the matching IoT device, wherein the controller is further configured to determine that said at least one IoT device is in front of the user interface arrangement and within the three-dimensional cone having the center located at the user interface arrangement by determining an angle to the at least one IoT device utilizing an Angle-of-Departure feature of a short-range wireless communication device or an angle from the at least one IoT device utilizing an Angle-of-Arrival feature of the short-range wireless communication device.

2. The user interface arrangement according to claim 1, wherein the sensor comprises an audio input device and wherein the received input is audio, and wherein the controller is further configured to detect the indication of at least one command by detecting that there is at least one word in the received audio input.

3. The user interface arrangement according to claim 2, wherein the controller is further configured to detect that there is at least one word in the received audio input by analyzing physical characteristics of the received audio input.

4. The user interface arrangement according to claim 3, wherein analyzing the physical characteristics of the received audio input comprises:

determining that at least one portion of the audio input is in a frequency range corresponding to spoken words.

5. The user interface arrangement according to claim 4, wherein analyzing the physical characteristics of the received audio input further comprises one or more of:

determining that said at least one portion is of a duration;

determining that said at least one portion is in an amplitude range; and determining that said at least one portion is in a sequence of portions.

6. The user interface arrangement according to claim 1, wherein the controller is further configured to extract the at least one command from the input utilizing speech analysis.

7. The user interface arrangement according to claim 1, wherein the controller is further configured to match at least one extracted command by causing the at least one IoT device to perform the matching.

8. The user interface arrangement according to claim 1, wherein the controller is further configured to receive a user input acknowledging the execution of the command.

9. The user interface arrangement according to claim 1, wherein the first power level enables receiving input, the second power level enables operating the communication interface, and the third power level enables extraction of commands from the input.

10. The user interface arrangement according to claim 1, wherein the sensor comprises a motion sensor, and the received input comprises at least one gesture.

11. The user interface arrangement according to claim 1, wherein the extracted command comprises an identifier for one of the at least one IoT devices.

12. A method for a user interface arrangement comprising a sensor and a communication interface, wherein the user interface arrangement is a pair of glasses and wherein the sensor is arranged to receive input, wherein the method comprises:

causing the user interface arrangement to operate in a first power level;

receiving said input while operating the user interface arrangement in the first power level;

detecting an indication of at least one command, and in response thereto cause the user interface arrangement to operate in a second power level, wherein the second power level is higher than the first power level;

while operating the user interface arrangement in the second power level, determining that at least one Internet of Things (IoT) device is in front of the user interface arrangement and within a three-dimensional cone having a center located at the user interface arrangement, and in response thereto cause the user interface arrangement to operate in a third power level, wherein the third power level is higher than the second power level;

while operating the user interface arrangement in the third power level, extracting at least one command from the input;

matching the extracted at least one command to the at least one IoT device, and when a match is found:

executing the extracted at least one command on the matching IoT device, wherein the method further comprises:

determining that said at least one IoT device is in front of the user interface arrangement and within the three-dimensional cone having the center located at the user interface arrangement by determining an angle to the at least one IoT device utilizing an Angle-of-Departure feature of a short-range wireless communication device or an angle from the at least one IoT device utilizing an Angle-of-Arrival feature of the short-range wireless communication device.

13. A non-transitory computer-readable medium carrying computer instructions that when loaded into and executed by a controller of a user interface arrangement enables the user interface arrangement to implement a method for the user interface arrangement, wherein the user interface arrangement comprises a sensor and a communication interface, wherein the user interface arrangement is a pair of glasses and wherein the sensor is arranged to receive input, and wherein the method comprises:

causing the user interface arrangement to operate in a first power level;

receiving said input while operating the user interface arrangement in the first power level;

detecting an indication of at least one command, and in response thereto cause the user interface arrangement to operate in a second power level, wherein the second power level is higher than the first power level;

while operating the user interface arrangement in the second power level, determining that at least one Internet of Things (IoT) device is in front of the user interface arrangement and within a three-dimensional cone having a center located at the user interface arrangement, and in response thereto cause the user interface arrangement to operate in a third power level, wherein the third power level is higher than the second power level;

while operating the user interface arrangement in the third power level, extracting at least one command from the input;

matching the extracted at least one command to the at least one IoT device, and when a match is found:

executing the extracted at least one command on the matching IoT device, wherein the method further comprises:

determining that said at least one IoT device is in front of the user interface arrangement and within the three-dimensional cone having the center located at the user interface arrangement by determining an angle to the at least one IoT device utilizing an Angle-of-Departure feature of a short-range wireless communication device or an angle from the at least one IoT device utilizing an Angle-of-Arrival feature of the short-range wireless communication device.

14. A circuitry arrangement for a user interface arrangement comprising a sensor and a communication interface, wherein the user interface arrangement is a pair of glasses and wherein the sensor is arranged to receive input, and wherein the circuitry arrangement comprises:

circuitry for causing the user interface arrangement to operate in a first power level;

circuitry for receiving said input while operating the user interface arrangement in the first power level;

circuitry for detecting an indication of at least one command, and in response thereto cause the user interface arrangement to operate in a second power level, wherein the second power level is higher than the first power level;

circuitry for determining, while operating the user interface arrangement in the second power level, that at least one Internet of Things (IoT) device is in front of the user interface arrangement and within a three-dimensional cone having a center located at the user interface arrangement, and in response thereto cause the user interface arrangement to operate in a third power level, wherein the third power level is higher than the second power level;

circuitry for extracting, while operating the user interface arrangement in the third power level, at least one command from the input;

circuitry for matching the extracted at least one command to the at least one IoT device, and if a match is found, activating circuitry for executing the extracted at least one command on the matching IoT device; and the circuitry for executing the extracted at least one command on the matching IoT device, wherein the circuitry further comprises:

circuitry for determining that said at least one IoT device is in front of the user interface arrangement and within the three-dimensional cone having the center located at the user interface arrangement by determining an angle to the at least one IoT device utilizing an Angle-of-Departure feature of a short-range wireless communication device or an angle from the at least one IoT device utilizing an Angle-of-Arrival feature of the short-range wireless communication device.

* * * * *